Aug. 19, 1952  E. C. PITZER  2,607,809
DRY CELL ASSEMBLY
Filed Jan. 11, 1949
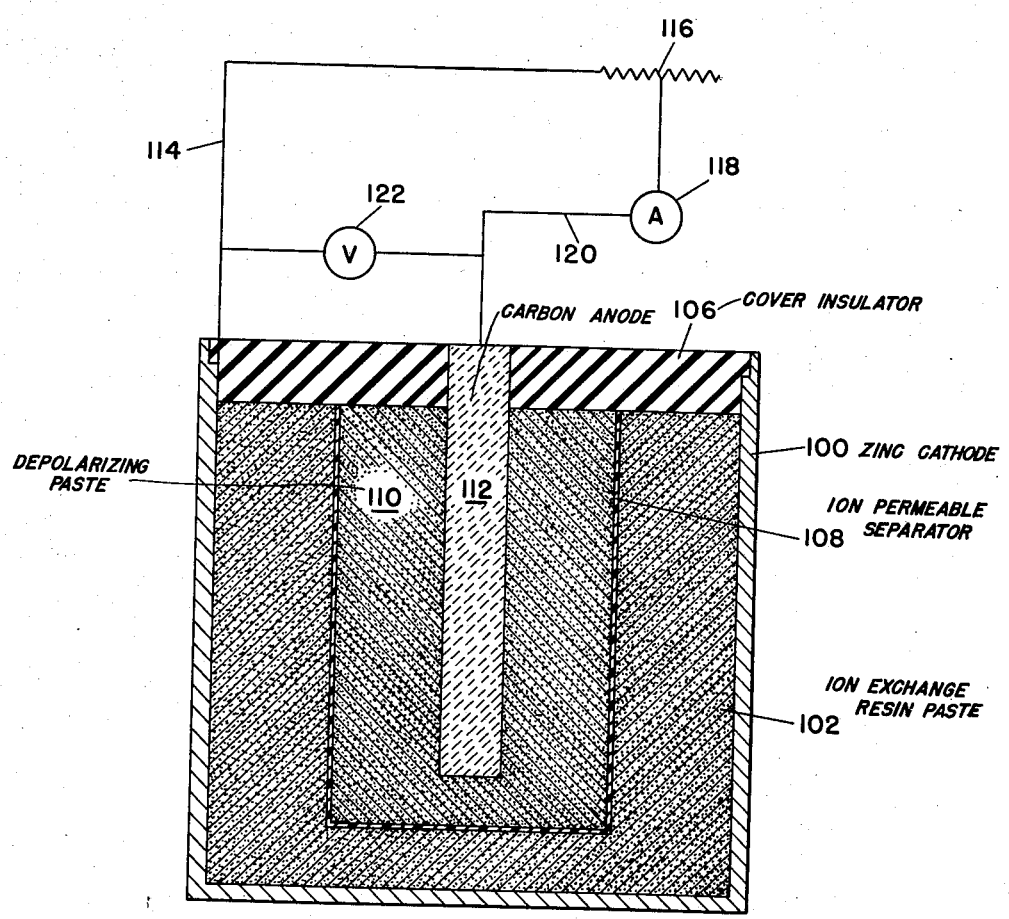
INVENTOR.
EDGAR C. PITZER
BY Patented Aug. 19, 1952

2,607,809

UNITED STATES PATENT OFFICE 2,607,809

DRY CELL ASSEMBLY

Edgar C. Pitzer, Schenectady, N. Y., assignor to the United States of America as represented by the United States Atomic Energy Commission Application January 11, 1949, Serial No. 70,347

2 Claims. (Cl. 136—83)

The present invention relates to an improved filler composition for voltaic cells and to a voltaic cell containing this filler composition.

The principle of the so-called dry cell is well known and the construction of commercial cells is fairly well standardized. As stated in the patent of Arsem, U. S. Patent Number 2,306,927, the commercial dry cell is made up as follows:

A container of zinc serves as an anode; a depolarizing assembly serves as a cathode and is in the form of a core or bobbin made up of a filler composition containing carbon, manganese dioxide and a solution of zinc and ammonium chlorides, this core being mounted around or in contact with a carbon rod which serves as a means of contact with the cathodic depolarizing assembly, and as an external electrode. The space between the cathode core and the zinc anode is filled with a filler composition in the form of a paste containing zinc and ammonium chlorides and a stiffening agent such as starch or charcoal. In the ordinary dry cell the stiffening agent contributes nothing to the performance of the cell but serves merely to keep the electrolyte in a semi-solid form or paste.

During the operation of the cell the zinc electrode reacts with the ammonium chloride solution according to the equation,

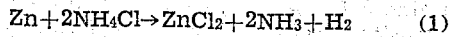

$$Zn + 2NH_4Cl \rightarrow ZnCl_2 + 2NH_3 + H_2 \quad (1)$$

As a result of the reaction the pH of the electrolyte increases and also basic zinc salts are formed. The effect of these reactions on the cell is a more rapid depletion of the cell than would occur in the absence of these reactions. The inclusion of free acid in the paste does offset the harmful effects of such reactions to a small degree but it may also provide the possibility of corrosion of the zinc electrode in which the paste is stored; a result which may be more harmful than the effects of the increase of pH.

It is an object of the present invention to provide a voltaic cell capable of delivering more stable voltage under a sustained load.

It is another object of the present invention to provide a filler composition for a voltaic cell which increases the voltage stability and recoverability of the cell.

It is a further object of the present invention to provide a voltaic cell which quickly recovers its initial voltage after a relatively short use.

It is a still further object of the present invention to provide a filler composition for a voltaic cell which minimizes the increase in the pH and the formation of basic zinc salts in the cell.

Other objects of the present invention will be in part obvious and in part pointed out hereinafter.

Referring to the drawing wherein a preferred arrangement of the elements of the present invention is illustrated, a carbon rod electrode 112 is axially positioned in a generally cylindrically shaped deposit 110 of manganese dioxide paste. This paste is formed by mixing finely divided manganese dioxide powder with sufficient saturated ammonium chloride solution to give the mixture a thick paste-like consistency. The manganese dioxide paste is enveloped on sides and bottom by a relatively thick paste of ion exchange resin 102 and separated from said resin by a layer of unglazed cellophane 108. The resin paste may be formed, for example, by mixing 50 to 60 cubic centimeters of saturated ammonium chloride solution with each 100 grams of a base exchange resin, identified more fully below, said resin having been pretreated with an acid such as hydrochloric acid. Twenty mesh resin is found suitable for this purpose. The resin paste is contained by and kept in electrical contact with a cylindrical zinc metal electrode 100 such as is conventionally used in dry cells. A cover of waxlike or plastic resist material 106 is provided on the upper surface of the paste layers so as to prevent evaporation of water therefrom.

A conventional external circuit may be attached to the cell to measure the voltage and amperage produced. Thus, the zinc electrode 100 may be connected through a conductor 114, the load 116, the milliameter 118, and the conductor 120 to the carbon electrode 112, and a voltmeter may be connected between the conductors 114 and 120 to measure the voltage developed between the electrodes. The current drawn from the cell is measured by means of the milliameter 118 connected in series with the cell.

The cell filled with the composition containing an ion exchange resin has a greater voltage stability, particularly at relatively low loads, than previously known cells. Such improved cells are capable of quick recovery from higher loads of short duration.

In order to illustrate the efficiency of operation of a cell provided by the present invention as compared with a conventional cell, the entire anode assembly from a new and unused commercial cell such as is commonly used in flash lights was removed from its zinc cathode jacket and was inserted intact into a slurry composed of a base exchange resin of a type which will be more fully identified below and aqueous ammonium chloride solution. The slurry was contained in an amalgamated zinc cathode container. This cell identified as resin-filled cell No. 1 was discharged through a 10 ohm external resistance and the voltage and current were measured at five minute intervals. The same measurements were made individually on two new unused conventional cells such as that from which the anode assembly employed in resin-filled cell No. 1 was obtained. These conventional cells were identified as conventional cells No. 1 and No. 2 and the results obtained from these tests are listed in Table I.

Table I

| Time, Minutes | Dowex filled Cell No. 1 | | Conventional Cell No. 1 | | Conventional Cell No. 2 | |
|---|---|---|---|---|---|---|
| | Voltage | Amperes Current | Voltage | Amperes Current | Voltage | Amperes Current |
| 0 | 1.75 | 0.160 | 1.44 | 0.130 | 1.47 | 0.136 |
| 5 | 1.62 | 0.150 | 1.40 | 0.128 | 1.42 | 0.133 |
| 10 | 1.54 | 0.143 | 1.37 | 0.126 | 1.40 | 0.133 |
| 15 | 1.52 | 0.141 | | | | |
| 20 | 1.48 | 0.140 | | | | |
| 25 | 1.45 | 0.138 | | | | |
| 30 | 1.43 | 0.136 | | | | |

It is obvious from a consideration of the voltages and amperages listed in Table I for a resin-filled cell as compared to the conventional cells that the resin-filled cell delivers a higher current at a greater voltage for a longer time than do conventional cells. Thus, it is seen that after one-half hour's steady discharge through a 10 ohm external resistance the resin-filled cell produced a voltage and current which compared favorably with the initial voltage and current produced by conventional cells.

A second resin-filled cell, identified as resin-filled cell No. 2, was prepared and its recuperation voltage immediately after a short circuit of the cell which lasted for six minutes was compared with the recuperation voltage of two additional new and unused conventional cells which were individually short circuited for the same period of time. The initial voltages and recuperation voltages of these cells are listed in Table II.

Table II

| | Initial Voltage | Recuperation Voltage |
|---|---|---|
| Resin-filled Cell No. 2 | 1.95 | 1.25 |
| Conventional Cell No. 3 | 1.40 | 1.05 |
| Conventional Cell No. 4 | 1.50 | 1.00 |

These results indicate that the use of resin slurry of the type described below in conjunction with a conventional cell anode assembly, not only permits the maintenance of higher voltages at loads in the order of 10 ohms, but also indicate that such resin-filled cells have higher recuperation voltages than such conventional cells.

The theory of the operation of such a cell is not fully understood. The following is offered as an explanation although it will be understood that the concept of the invention is not to be limited by the accuracy of this explanation.

Representing the acid form of the resin by $H_2R$ the reactions in the cell may be expressed by the following equations:

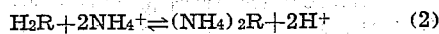
(2)

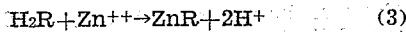
(3)

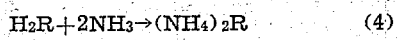
(4)

Reaction (2) represents an equilibrium between the ammonium and hydrogen ions in the solution, the resin acting as an insoluble buffer. Reaction (3) removes zinc ions from the solution and also tends to resist changes in pH. Reaction (4) consumes ammonia produced by Reaction (1). When the resin is spent it will continue to serve as an inert filler, and will not interfere with the output of the cell.

The spent resin can be regenerated by digesting with dilute acid and thorough washing with water.

A resin found suitable for use as a synthetic cation exchange resin is sold under the trade name of Dowex 50. This product is an aromatic hydrocarbon polymer of the type described by D'Alelio in U. S. Patent 2,366,077, containing nuclear sulfonic acid groups as the sole ion active group at any pH value.

The resins suitable for use according to the present invention are not limited to an aromatic hydrocarbon polymer containing nuclear sulfonic acid groups such as Dowex 50, which is a water insoluble sulfonated polymerizate of a polyvinyl aryl compound. Any ion exchange resin capable of inhibiting the rise of pH of a substance susceptible to such a rise due to the formation therein of basic cations, is suitable for this purpose.

Such other synthetic cation absorbers as are described in the patents of D'Alelio Numbers 2,340,110; 2,373,547; 2,373,548; 2,373,549; 2,366,008 and others are also suitable for use according to the present invention, as are such resins as sulfonated petroleum coke, greensand and synthetic inorganic zeolites. All of the ion exchange resins are preferably used in the acid form. In addition, other agents which inhibit the rise of pH of the cell as, for example, the nitrate or oxalate of urea may be employed in dilute mixture with inert ingredients.

Since many embodiments might be made of the present invention and since many changes might be made in the embodiment described, it is to be understood that the foregoing description is to be interpreted as illustrative only and not in a limiting sense.

I claim:

1. A voltaic dry cell comprising an inert anode, a zinc cathode, a layer of a depolarizing paste consisting essentially of manganese dioxide and a saturated ammonium chloride solution ambient to said anode, a layer of resin paste in contact with said cathode, said paste consisting of a resin and saturated ammonium chloride solution, said resin being in acid form and selected from the group consisting of sulphonated petroleum coke, greensand, synthetic inorganic zeolites, aromatic hydrocarbon polymers containing nuclear sulphonic acid groups as the sole ion active group at any pH value, and phenol formaldehyde derivatives, and said layers being separated by and making electrical contact through an ion permeable separating member.

2. A voltaic dry cell comprising an inert anode, a zinc cathode, a layer of manganese dioxide and saturated ammonium chloride solution in paste form ambient to said anode, a layer of a resin paste containing about 5 to 6 cubic centimeters of saturated ammonium chloride solution for each 10 grams of resin, said paste being in contact with said cathode and said resin being selected from the group consisting of sulphonated petroleum coke, greensand, synthetic inorganic zeolites, aromatic hydrocarbon polymers containing nuclear sulphonic acid groups as the sole ion active group at any pH value, and phenol formaldehyde derivatives, and said layers being separated by and making electrical contact through an ion permeable separating member.

EDGAR C. PITZER.

REFERENCES CITED

The following references are of record in the file of this patent:

UNITED STATES PATENTS

| Number | Name | Date |
|---|---|---|
| Re. 22,065 | Young | Apr. 7, 1942 |
| 1,581,851 | Martus | Apr. 20, 1926 |
| 1,788,870 | Heise | Jan. 13, 1931 |
| 1,835,867 | Heise | Dec. 8, 1931 |
| 1,835,868 | Heise | Dec. 8, 1931 |
| 1,865,652 | Heise | June 28, 1932 |
| 2,306,927 | Arsem | Dec. 29, 1942 |
| 2,463,565 | Ruben | Mar. 8, 1949 |

FOREIGN PATENTS

| Number | Country | Date |
|---|---|---|
| 16,008 | Great Britain | of 1905 |
| 389,738 | Great Britain | Mar. 23, 1933 |